Aug. 28, 1928.
R. EHRENFELD
1,682,493
CLUTCH
Filed May 27, 1926
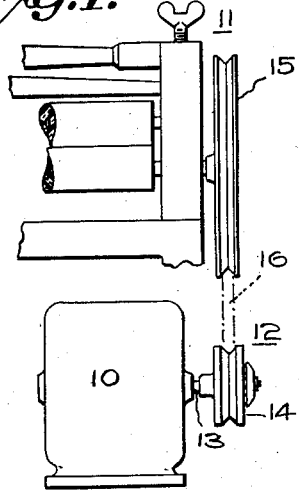
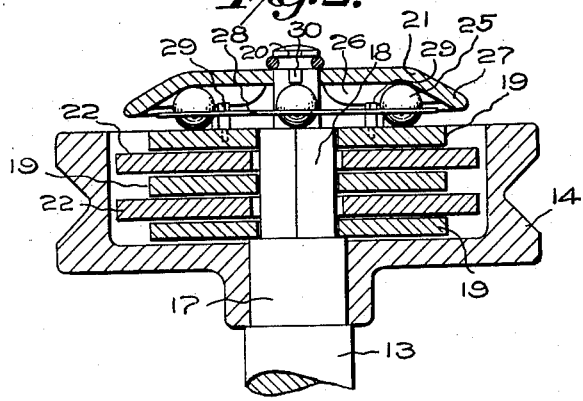
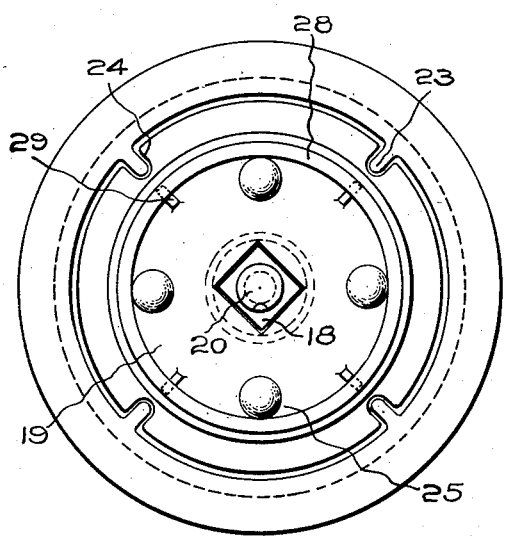
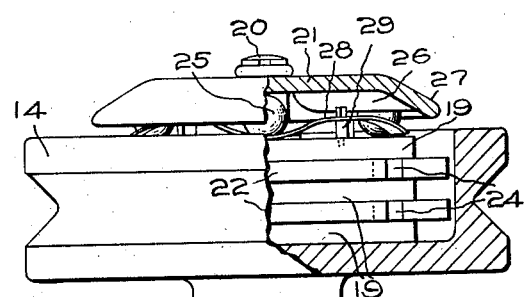
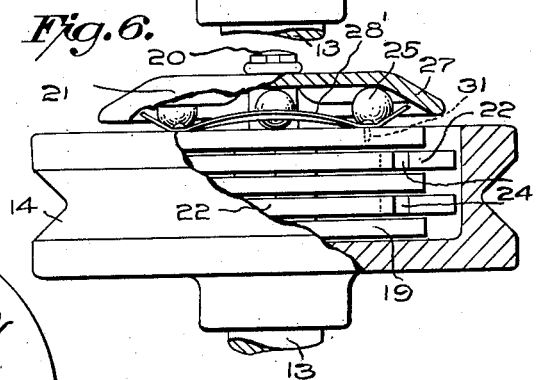
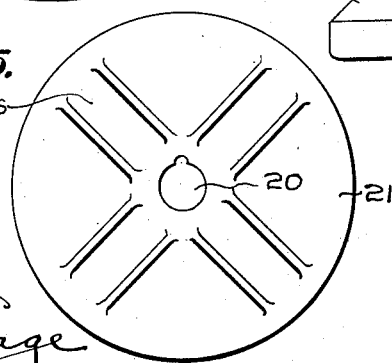
WITNESSES:
R. S. Harrison
E. W. Savage
INVENTOR
Ralph Ehrenfeld
BY
Wesley G. Carr
ATTORNEY Patented Aug. 28, 1928.

1,682,493

UNITED STATES PATENT OFFICE.

RALPH EHRENFELD, OF EAST PITTSBURGH, PENNSYLVANIA, ASSIGNOR TO WESTINGHOUSE ELECTRIC & MANUFACTURING COMPANY, A CORPORATION OF PENNSYLVANIA.

CLUTCH.

Application filed May 27, 1926. Serial No. 111,933.

This invention relates to improvements in clutches and more particularly to automatic clutches.

The object of the invention, generally stated, is the provision of an automatic clutch that shall be simple and efficient in operation and readily and economically manufactured.

A more specific object of the invention is to provide for automatically connecting a motor to a load only when the motor has reached a predetermined speed.

A further object of the invention is to provide for quick and positive engagement of the clutch members when a motor has reached a suitable speed for carrying a load.

Other objects of the invention will, in part, be obvious and in part appear hereinafter.

The invention accordingly is disclosed in the embodiment thereof shown in the accompanying drawing and comprises the features of construction, combination of elements and arrangement of parts that will be exemplified in the construction hereinafter set forth and the scope of the application of which will be indicated in the claims.

For a fuller understanding of the nature and objects of the invention, reference should be had to the following detailed description, taken in connection with the accompanying drawing, in which;

Figure 1 is a side elevation of a clutch constructed in accordance with this invention, showing it interposed between a wringer and motor for the transmission of power;

Fig. 2 is a vertical sectional view taken through the clutch, showing features of construction;

Fig. 3 is a top plan view of the clutch, with the cap removed to show the relation of the parts;

Fig. 4 is a view, in side elevation, of the clutch with a portion of the driven member broken away to show the relation of the parts when the clutch members have been engaged;

Fig. 5 is a bottom view of the cap, showing the raceways for the clutch-actuating members, and Fig. 6 is a side elevation of a modified clutch, showing the novel features of the construction.

Referring now to the drawing, 10 designates a motor of any well-known type that may be used for operating some such apparatus as a washing-machine wringer indicated generally at 11. As shown, a clutch, indicated generally by the numeral 12 and constructed in accordance with this invention, is provided on the motor shaft 13 for the transmission of power to the wringer 11.

Since clutches are generally used for the transmission of power, they are constructed for connecting a driving member to a driven member. In this particular embodiment of the invention, the motor shaft 13 may be referred to as the driving member and the pulley 14 as the driven member. In order to transmit power from the pulley 14 to the wringer pulley 15, any suitable means, such as a belt 16, may be employed.

As illustrated in Fig. 2, the driving member or shaft 13, is stepped to provide a bearing 17 on which the pulley 14 is rotatably mounted. The next section 18, progressing outwardly along the driving member, is squared for the reception of clutch plates 19, and the end section 20 of the shaft is so shaped that a cap 21 may be attached thereto in a predetermined position.

In this embodiment of the invention, three clutch plates, provided with square openings, adapting them to be mounted on the square section 18 of the shaft 13, are utilized as the clutch-driving members. Two driven clutch members 22, which are made in the form of annular plates, are disposed to alternate with the clutch plates 19. However, it will be readily understood that any number of plates necessary to meet any operating conditions may be utilized.

In the interest of compactness of construction, the pulley 14 is made hollow to serve as a casing for the plates 19 and 22. The plates 22 may be connected to the pulley in any suitable manner and, in this particular construction, inwardly projecting ribs 23, formed integral with the pulley, are provided and disposed to engage in slots 24 cut in the rims of the plates 22.

Since the plates 19 and 22 are disposed to interfit, they may be engaged to connect the driving member to the driven member by pressing them together.

Any material having the proper coefficient of friction may be used in the construction of the clutch plates 19 and 22. The selection of the material will depend on the purpose for which the clutch is to be used.

In order to provide for the automatic actuation of the clutch plates 19 and 22, to cause them to engage one another, a plurality of balls 25 are mounted on the outer plate 19. These balls are retained in predetermined positions by means of race ways 26 mounted on the inner face of the cap 21. As shown, the raceways extend radially outward from the center of the cap so as to permit the balls to move along radial lines when acted upon by a centrifugal force.

In order to force the balls 25 in the direction of the plates 19 and 22, when the former are subject to a centrifugal force, the outer margin 27 of the cap 21 is inclined downwardly, as shown in Figs. 2, 4 and 6.

It has been found that, when motors having a capacity only sufficient to carry a predetermined load when running at rated speed are used to start in operation a device, such as a wringer or centrifugal drier, they suffer greatly from heating during the starting period. Sometimes the heating is sufficient to cause a breakdown.

Accordingly, this clutch has been provided to prevent the connecting of the motor to the load before the motor has reached a predetermined speed. In the case of motors provided for driving wringers, and the like, it is desirable that the motor rotate at substantially 50% to 70% of its rated speed before the clutch functions to connect it to the load.

In this clutch, means is provided for preventing the balls 25 from moving outward until the motor and, therefore, the clutch-driving members, have reached a desired speed. As illustrated in this embodiment of the invention, a resilient ring 28 of any suitable metal, such as spring, brass or steel, is utilized to restrict the movement of the balls.

The ring 28 might be mounted in a number of ways, but, in this case, it is supported on a plurality of stepped posts 29 carried by the outer plate 19. By making the inner portions of the post sufficiently high, the cap 21 may be utilized for retaining the ring 28 in position.

The balls 25 are located midway between the posts provided for supporting the ring. The ring is disposed slightly below the centers of the balls so that, as the centrifugal force increases, the component, acting downwardly, will become great enough to bend the ring 28 and permit the balls to move outwardly between the cap 21 and the clutch plate 19.

The cap 21 is fixed to the end section 20 of the shaft or driving member 13 by means of a pin 30. Accordingly, the balls 25 cannot be revolved about the axis of the shaft but are restricted to movement along radial lines on the clutch plate 19.

Assuming that a motor, having a rated speed of 1750 R. P. M., is provided for actuating a wringer, such as I have illustrated, the motor is started and permitted to accelerate until it rotates at a speed of 850 to 1100 R. P. M. Then, the centrifugal force, acting upon the balls 25, develops a component acting downwardly on the ring 28 which is great enough to cause the balls to bend the ring and move outwardly between the cap 21 and the plate 19. When the balls move outwardly over the ring, they press downwardly on the plates 19 and 22, causing them to engage one another and connect the driving member to the driven member.

It will be readily understood that, when the ring 28 begins to bend downwardly, its resistance will be rapidly decreased, and substantially the full effect of the centrifugal force will be applied to project the balls 25 outwardly between the sloping face of the cap 21 and the plates. In this manner, when the motor has reached a desired speed, the clutch will be automatically actuated to connect the driving and driven members.

If, for any reason, such as the failure of power, the motor is brought to a stop, the balls 25 are no longer subjected to the action of centrifugal force and, under the influence of the resilient ring 28, they are moved inwardly toward the axis of the driving member 13. Accordingly, they are set in an inactive position and pressure is removed from the clutch members so that, when the motor is started again, the load is disconnected.

In constructing a clutch of this type, many methods of restricting the outward movement of the balls 25 and, therefore, the actuation of the clutch until the motor and driving members have reached a predetermined speed, may be provided. In Fig. 6, a modification of the structure shown in Figs. 1 to 5, inclusive, is illustrated. In the embodiment illustrated in Fig. 6, the resilient ring 28' is crimped to give it a wavy appearance. Accordingly, when it is set on the clutch disc 19, it presents a number of upwardly extending resilient portions which are disposed in front of the balls 25. In order to retain the ring in position, a single pin 31 is driven therethrough into the disc 19.

As shown, the raised portions of the ring 28', are located slightly below the centers of the balls 25. Consequently, on starting the motor, the operation is as hereinbefore described and, when the centrifugal force becomes great enough to overcome the resiliency of the spring member 28', the balls 25, move outwardly between the cap 21 and the plates. In this manner, the clutch members are caused to engage one another, and the motor is connected to the load.

Since certain changes may be made in the above construction, and different embodiments of the invention may be made without departing from the scope thereof, it is intended that all matter contained in the above description, or shown in the accompanying drawing, shall be interpreted as illustrative and not in a limiting sense.

I claim as my invention:

1. In a clutch, in combination, a plurality of interfitting clutch plates adapted to engage one another, ball members carried by one of the clutch plates and disposed to move outwardly under the action of centrifugal force, means cooperative with the ball members to effect engagement of the clutch plates as the balls move outwardly and a spring ring embodying alternate yielding and non-yielding portions and mounted on one of said clutch plates for preventing the outward movement of the ball members until the clutch plate rotates at a predetermined speed.

2. A clutch comprising, in combination, a driving and a driven member, a plurality of interfitting clutch plates disposed to engage one another and interposed between the driving and the driven members for the transmission of power, balls disposed for radial movement on one of the plates, said ball-carrying plate being connected to the driving member, means for revolving the balls with the driving member and about its axis, means cooperative with the revolving balls to effect the engagement of the clutch plates, and a spring ring secured to the ball-carrying plate for preventing outward radial movement of the balls until the driving member rotates at a predetermined speed.

3. A clutch comprising, in combination, a driving clutch member and a driven clutch member, said clutch members being adapted to engage each other, a plurality of balls carried by the driving clutch member and disposed for radial movement, means cooperative with the balls when they move outwardly under the action of a centrifugal force to effect the engagement of the clutch members, a resilient annular member encircling the balls, said resilient member being disposed below the centers of the balls, thereby to permit the balls to move outwardly when the component of the centrifugal force is great enough to depress the resilient member.

4. A clutch comprising, in combination, a driving clutch member and a driven clutch member, said clutch members being disposed to engage each other, a plurality of balls carried by the driving clutch member and disposed for radial movement, a resilient ring supported on the driving clutch member and disposed to engage the balls at a point slightly below their centers, said ring serving to prevent outward movement of the balls until the driving clutch member reaches a predetermined speed, and a cap having a downwardly sloping wall cooperative with said balls when acted on by centrifugal force to effect engagement of the clutch members.

In testimony whereof, I have hereunto subscribed my name this 25th day of May, 1926.

RALPH EHRENFELD.